(12) United States Patent
Dahlberg et al.

(10) Patent No.: US 7,185,393 B2
(45) Date of Patent: Mar. 6, 2007

(54) LEAF BLOWER

(75) Inventors: Göran Dahlberg, Gränna (SE); Gustaf Döragrip, Jönköping (SE); Peter Gunnarsson, Gränna (SE); Marcus Kragner, Huskvarna (SE); Anna Sjögren, Jönköping (SE); Esbjörn Ollas, Huskvarna (SE)

(73) Assignee: Aktiebolaget Electrolux, Stockholm (SE)

( * ) Notice: Subject to any disclaimer, the term of this patent is extended or adjusted under 35 U.S.C. 154(b) by 159 days.

(21) Appl. No.: 10/139,404

(22) Filed: May 6, 2002

(65) Prior Publication Data
US 2002/0166195 A1 Nov. 14, 2002

(30) Foreign Application Priority Data
May 11, 2001 (SE) .................................... 0101664

(51) Int. Cl.
*A47L 5/36* (2006.01)
(52) U.S. Cl. ........................................ 15/327.5; 15/405
(58) Field of Classification Search ................ 15/326, 15/327.5, 405, 330, 413
See application file for complete search history.

(56) References Cited

U.S. PATENT DOCUMENTS

| | | | | |
|---|---|---|---|---|
| 4,223,419 A * | 9/1980 | Sato et al. | ..................... | 15/405 |
| 5,052,073 A * | 10/1991 | Iida | ........................... | 15/327.5 |
| 6,077,033 A * | 6/2000 | Ishikawa | ..................... | 15/405 |
| 6,305,048 B1 * | 10/2001 | Salisian | ....................... | 15/326 |
| 6,324,721 B2 * | 12/2001 | Doragrip | ..................... | 15/326 |
| 6,370,729 B2 * | 4/2002 | Miyamoto | .................... | 15/326 |
| 6,503,065 B2 * | 1/2003 | Tanaka et al. | .............. | 417/366 |
| 6,575,695 B1 * | 6/2003 | Miyamoto | .................... | 15/326 |
| 6,736,610 B2 * | 5/2004 | Cifarelli | ..................... | 417/366 |
| 2001/0002501 A1 | 6/2001 | Doragrip | | |
| 2002/0067995 A1 * | 6/2002 | Cifarelli | ..................... | 417/234 |

FOREIGN PATENT DOCUMENTS

DE  197 18 360 A1  5/1998
EP  1 074 178 A1  2/2001

\* cited by examiner

*Primary Examiner*—Theresa T. Snider
(74) *Attorney, Agent, or Firm*—Pearne & Gordon LLP

(57) ABSTRACT

Leaf blower that is carried on the back of the operator comprising at least an engine (14) and a fan. The fan is provided with an air inlet (13) placed on the side of the fan that is facing away from the back of the operator. The air stream is passing the engine (14) on its way to the air inlet (13) so that the engine (14) is cooled.

9 Claims, 5 Drawing Sheets

LEAF BLOWER

Figure 1:
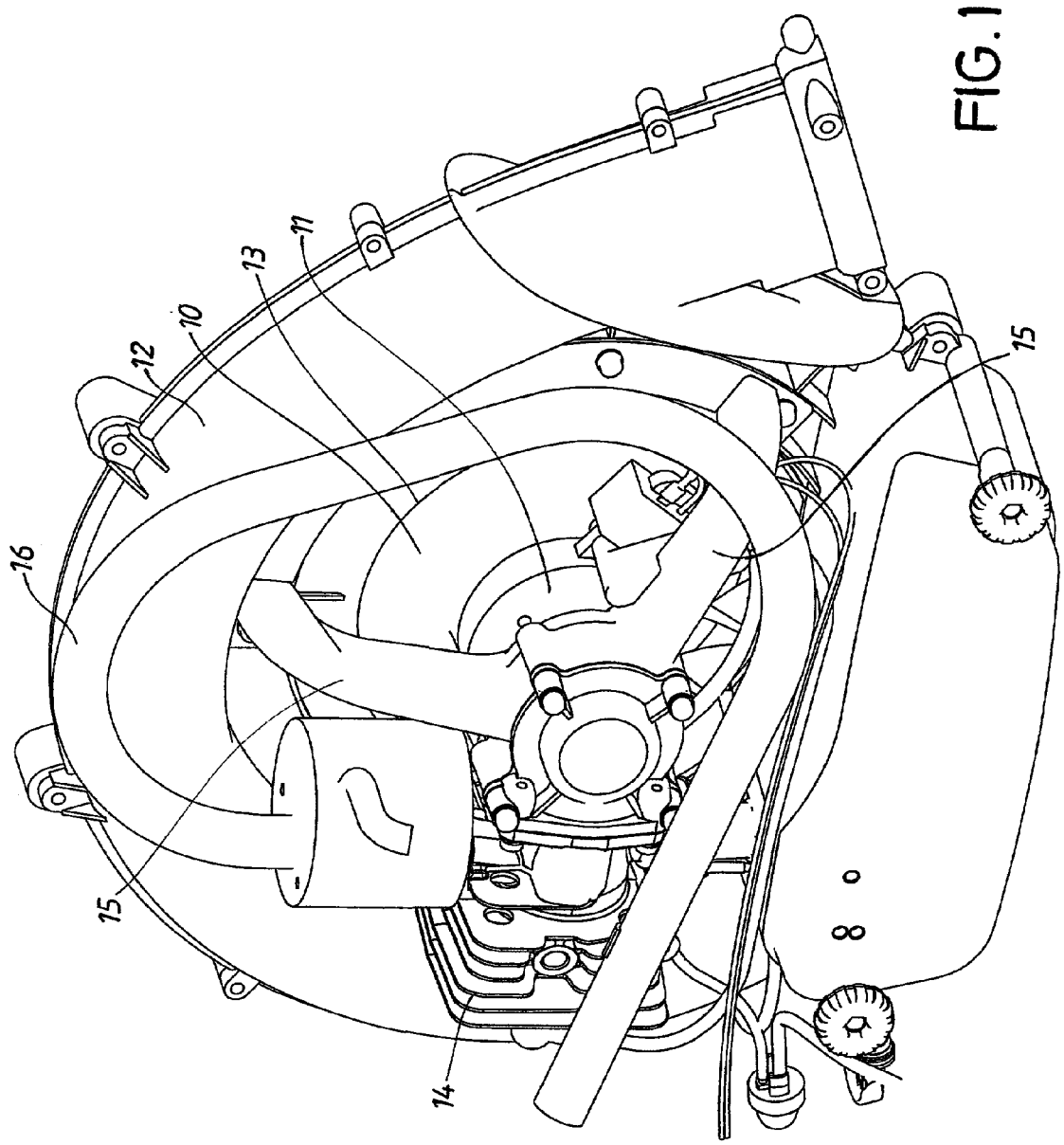

Combustion engine powered leaf blowers are used more and more for different kinds of work. The numbers of areas where leaf blowers are used is increasing and the leaf blowers are replacing traditional brooms. Leaf blowers are an effective and time saving tool for cleaning of large areas like for example parking places, pavements, lawns and footpaths.

Leaf blowers makes it possible to clean large areas in an easy way. During cleaning of an area with conventional equipment, cars parked in parking spaces make it necessary to leave parts of the area uncleaned. If the same area is cleaned with a leaf blower is it possible to blow away the rubbish underneath the parked cars, which will increase the efficiency, save time and improve the result.

Even though the leaf blower is an effective tool that helps the operator to clean large areas with the operator working long shifts carrying the leaf blower on the back. Leaf blowers available on the market today are large and heavy with the center of gravity for the tool placed at a long distance from the back of the operator. This will expose the operator to high loads when the leaf blower is carried on the back of the operator. This type of tool is also generating a lot of noise, which will make it very tiring for the operator as well as for other persons located close to the tool.

A leaf blower comprises at least a fan with a fan wheel, an engine and a couple of other details that is necessary to make the leaf blower work properly. Leaf blowers that are designed to be carried on the operators back that are available on the market today, for example illustrated in DE 197 18 360 A1, is designed with the fan and the fan wheel close to the operators back and secured to a supporting frame for example made of pipes or plates. The straps for carrying the leaf blower are secured in the supporting frame. Air to the fan is sucked into an inlet placed on the side of the fan that is turned towards the back of the operator. There must therefore be a gap of about 5 to 10 centimeters between the back of the operator and the inlet to the fan to guarantee that enough air will reach the inlet. The engine is then placed on the fan wheel axle on the side of the fan wheel that is turned away from the back of the operator. A leaf blower designed like this will have the center of gravity placed a long distance for the back of the operator. The distance between the center of gravity for the tool and the back of the operator is very important since it is related to the loads that the operator is exposed to as well as how easy it is to handle the tool. This distance should be as short as possible in order to minimise the loads on the operator.

There some different solutions used for cooling of the engine on the leaf blowers available on the market today. The engine can for example be cooled by a system where an amount of the air from the fan is lead to cool the engine. This solution has the drawback that it reduces the amount of air that can be used for the work that the tool is intended to do.

Another solution is to use the surrounding air for cooling of the engine. This solution, however, makes impossible to cover the noise generating parts since the cover will reduce the cooling of the engine.

A third solution is to provide the engine with a separate fan and devices that lead the air to the different components that need cooling. This solution is complicated, expensive and adds extra weight to the tool.

All the described solutions for cooling of the components in the leaf blower makes the tool heavier, more expensive or impossible to provide with some sort of insulation that reduces the noise from the tool.

The design of leaf blowers can therefor be improved in order to reduce the loads on the operator of the tool as well as the noise that is spread to the environment from the tool during use.

In this application is a new solution to the problems described above presented. The new solution will reduce the drawbacks in the prior art.

The leaf blower, defined by the claims, has a fan, fan outlet and engine with a new design. The fan is placed close to the back of the operator like in previous blowers but with the fan inlet facing away from the back of the operator. This means that the necessary gap between the fan inlet and the back of the operator can be eliminated and the fan moved closer to the back of the operator and consequently will the center of gravity be moved closer to the back of the operator.

In order to move the center of gravity further towards the back of the operator and reduce the size of the tool are several of the different components in the tool redesigned.

The fan wheel is moved as close to the back of the operator as possible which have resulted in that the fan outlet that is placed around the outer periphery of the fan wheel has been moved backwards in relation to the back of the operator. This change saves space since the diameter of the fan outlet can be reduced without decreasing the effect of the fan and also crates a bigger space inside the fan outlet than with the previous designs. This space makes it possible to place the engine in such a way that at least a part of the engine is located in the space within the fan outlet. This position of the engine reduces the distance between the engine and the back of the operator. The space within the fan outlet can also be used for other components so that they will have a position closer to the back of the inventor. The described development of the fan wheel, the fan outlet and the position of the engine will reduce the size of the leaf blower without reductions of the leaf blower's effect. This new design will also move the center of gravity for the blower closer to the back of the operator so working conditions for the operator is improved.

The engine is placed on the axle that drives the fan wheel on the side of the fan wheel facing away from the back of the operator. This means that the engine will be located in the center of the air stream to the fan. The air stream that passes the engine will then cool the engine that preferably is designed without any covers so that the cooling will be as good as possible. Also the other components placed in the air stream to the fan will be cooled by the air which should be considered when the layout of the machinery is designed so that components that needs cooling is placed where the air stream is strongest. This cooling of the components is an advantage since no air from the fan outlet has to be used for cooling of the engine and the other components. No one of the different components needs to be provided with separate cooling with this arrangement which will save weight and space.

Another advantage with this layout and design is that the blower easily can be provided with a protecting and insulating casing that covers all the different components in the machinery. The casing will reduce the amount of noise that is spread from the tool and also protect the different components inside the casing so that the tool will work longer. This casing is very effective for lowering the amount of noise from the different components inside the casing since the casing only needs a few opening. The casing needs at least an opening for air so that air to the fan inlet can get into the casing and also an opening for a pipe attached to the fan outlet so that air from the fan can pass out from the casing.

The exhaust gases for the engine is preferably led out from the casing through the pipe for the air from the fan or through a separate opening in the casing. The casing may also be provided with an opening in the top of the casing so that air heated by the hot components inside the casing can leave the casing. The heated air will rise up wards in the casing because of convection and leave the casing through the opening in the top of the casing.

The air that is sucked into the casing will cool the engine that otherwise would have been over heated inside the casing. The air inlet in the casing is placed so that the components that has the biggest need for cooling is placed closes to the air inlet in the casing.

The casing will improve the working conditions for the operator significantly and is also en efficient protection for the components inside the casing and therefore reduces the amount of damages that are done to the blowers during use or transportation.

One embodiment of the claimed invention is illustrated in the following figures.

FIG. 1. Illustrates a perspective view of some of the components in the leaf blower.

Figure 2:
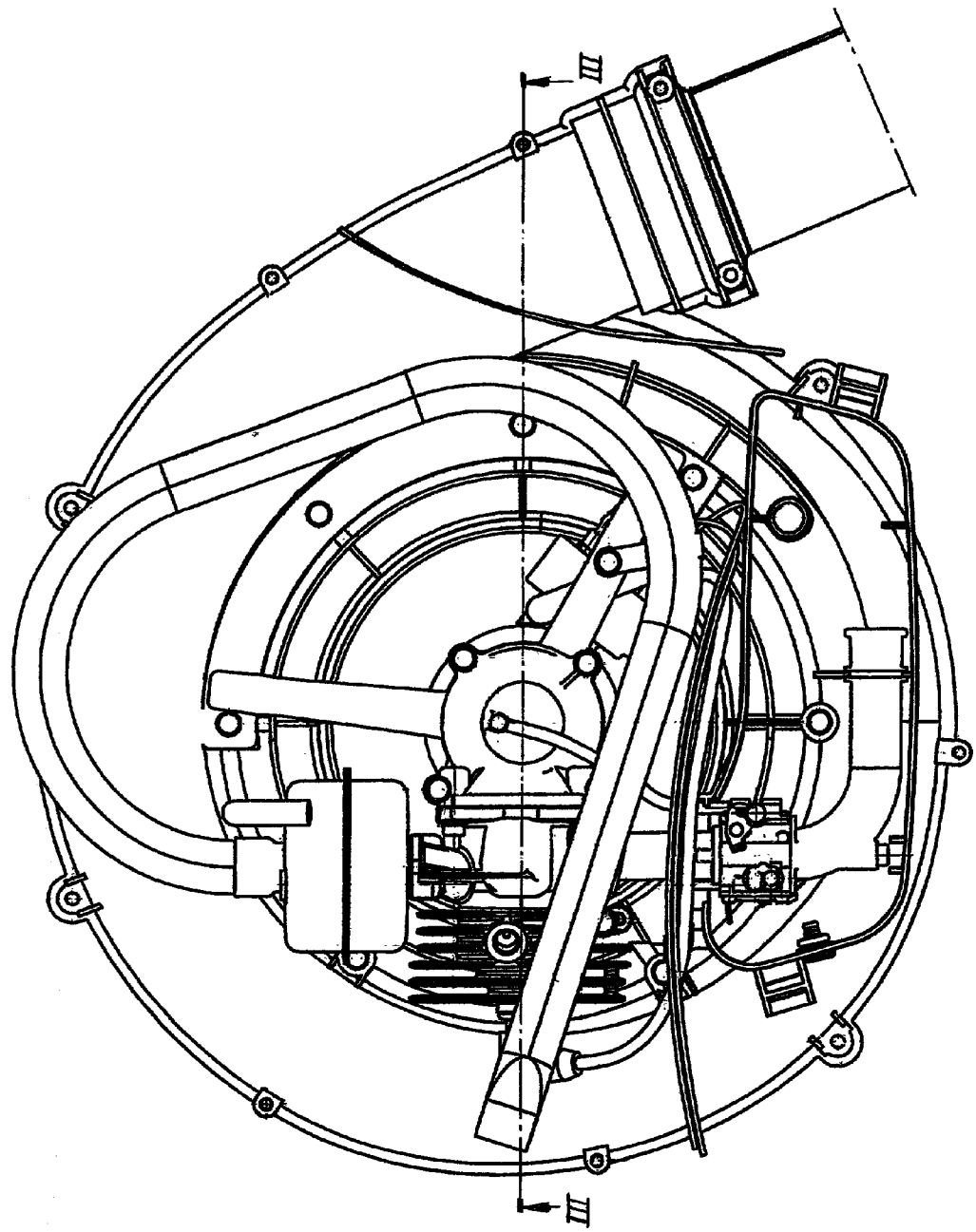

FIG. 2. Illustrates the side of a partly cut view of some of the components in the leaf blower that is facing away from the back of the operator.

Figure 3:
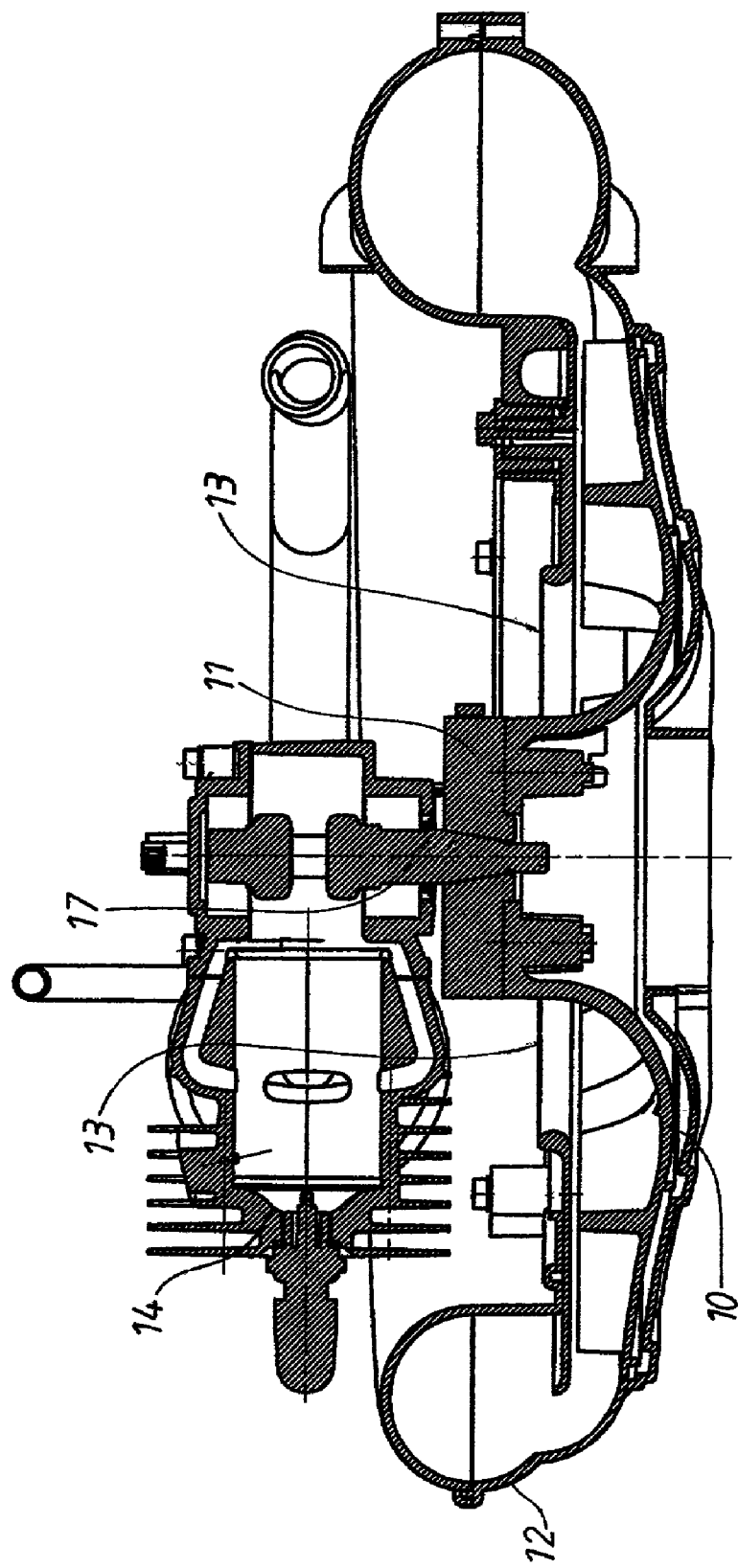

FIG. 3. Illustrates a cross section through III—III of the leaf blower.

Figure 4:
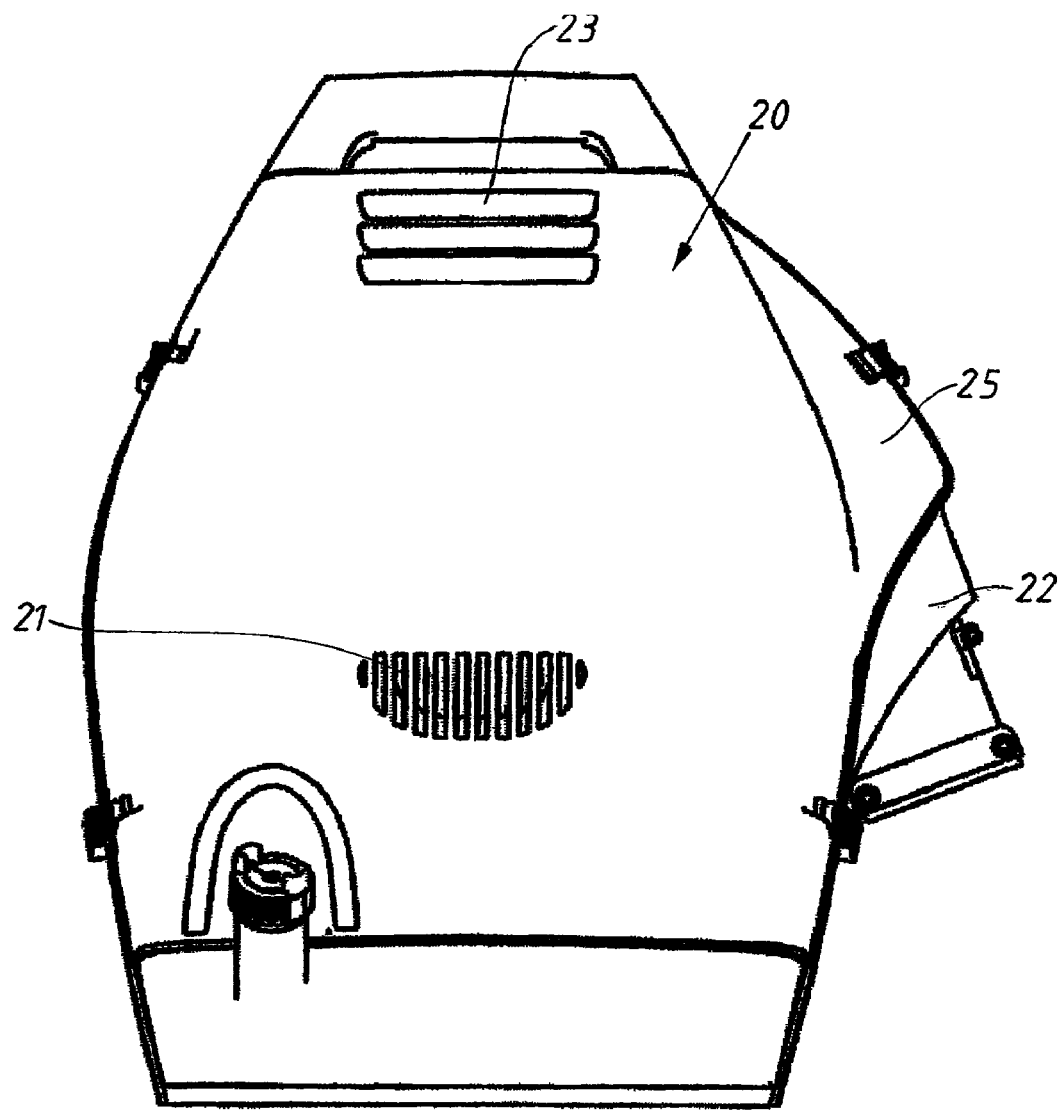

FIG. 4. Illustrates a leaf blower provided with a casing seen from the side facing away from the back of the operator.

Figure 5:
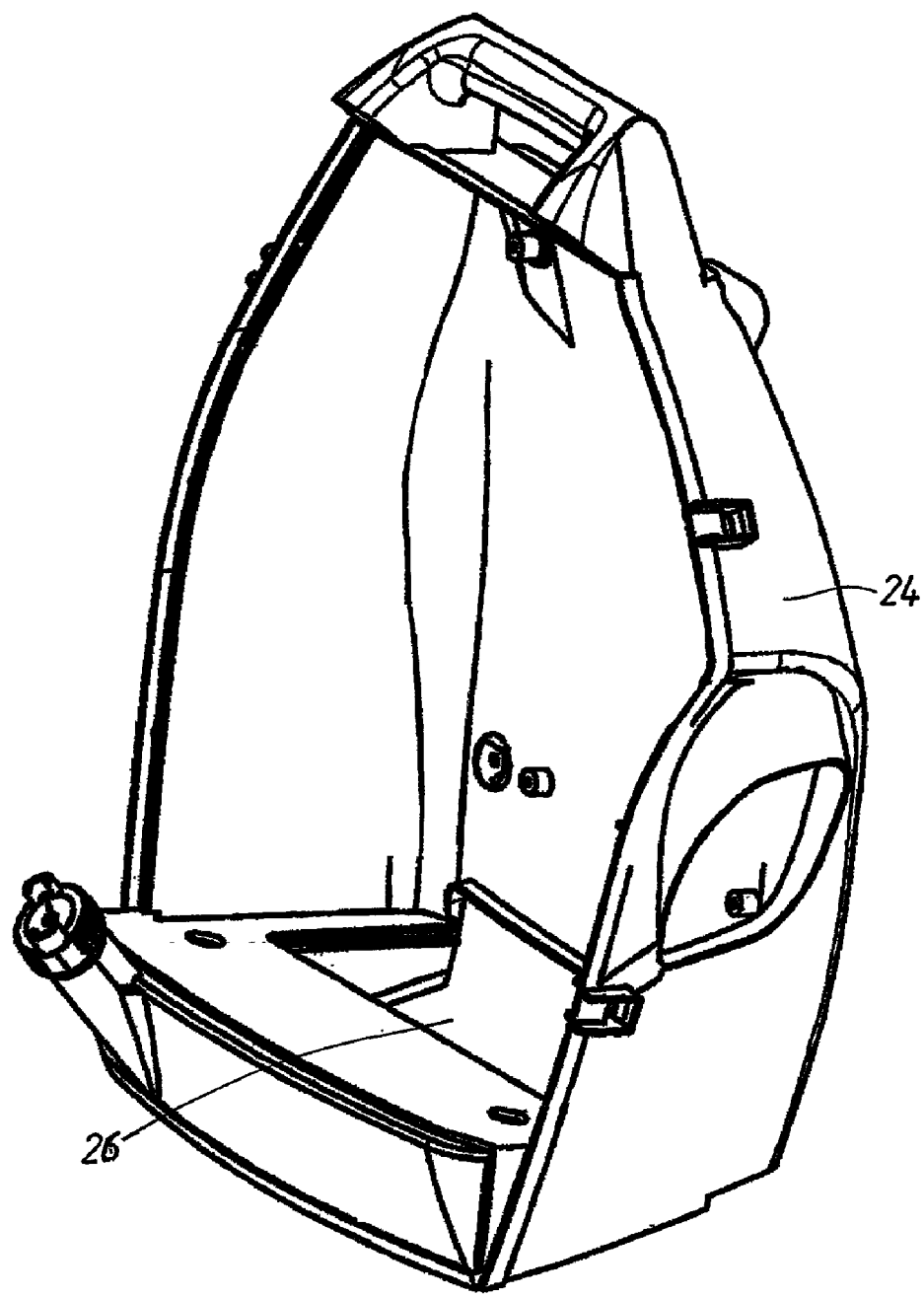

FIG. 5. Illustrates the bottom section of the casing in FIG. 4.

In FIG. 1 is the claimed leaf blower illustrated. The fan includes a fan wheel 10, a fan hub 11 and a fan housing including a fan outlet conduit 12. The fan wheel 10 is placed so that the flat side of the fan wheel 10 is parallel with the back of the operator. The fan outlet conduit 12 is shaped like a ring placed around the periphery of the fan wheel 10. The fan wheel 10 is moved forward to a position as close to the back of the operator as possible in order to create a space within the ring shaped fan outlet conduit 12 and make it possible to reduce the diameter of the ring shaped fan outlet conduit 12 without reducing the efficiency of the fan. The fan housing has an air inlet 13, which is placed on the side of the fan wheel 10 that is facing away from the back of the operator so that the fan wheel 10 and the ring shaped fan outlet conduit 12 can be placed close to back of the operator since no passage for air to the fan is necessary between the fan wheel and the back of the operator. In the space generated within the ring shaped fan outlet conduit 12 is at least a part of an engine 14 and other components that needs cooling placed in order to minimise the total size of the leaf blower. The engine 14 and the other components are fastened to a supporting frame 15 attached to the ring shaped fan outlet conduit 12. The supporting frame 15 makes it possible to attach different components like a muffler 16 in a solid way. The ring shaped fan outlet conduit 12 as well as a lot of different parts like the device for carrying the tool are attached to the supporting frame for the entire tool. This frame can be shaped in a lot of different ways.

In FIG. 3 is a cross-section of the leaf blower through III—III shown in order to illustrate components that are hidden in the previous figures. This figure makes it possible to see the fan wheel 10, the air inlet 13 and the engine 14 placed on an axle 17 that connects the engine 14 to the fan wheel 10.

In FIG. 4 is another embodiment of leaf blower illustrated. This leaf blower is provided with a casing 20 comprising two sections, one bottom half 24 that is placed towards the back of the operator and a lid 25. The casing 20 has an outlet 21 for exhaust gases, an opening 22 where a blower pipe is lead through the casing 20 and a second opening 23 for ventilation of heated air from the inside of the casing 20.

FIG. 5 illustrates the bottom half 24 of the casing 20. In the lower part of the casing is an inlet 26 for air to the fan placed. The inlet 26 may be provided with a protecting net in order to prevent that small things are sucked into the casing 20 together with the air.

The invention claimed is:

1. Leaf blower that is carried on the back of an operator comprising:
   an engine (14); and
   a fan comprising a fan housing with only one air inlet (13), a front side, and a back side opposite the front side, the air inlet (13) being located solely on the back side of the fan housing and the engine being positioned on the back side of the fan housing so that air must first flow over the engine before entering the air inlet (13).

2. Leaf blower according to claim 1, wherein the fan housing comprises a curved fan outlet conduit (12), and the fan further comprises a fan wheel (10) and a fan wheel axle (17).

3. Leaf blower according to claim 2, wherein the fan is placed so that the fan wheel axle (17) is perpendicular to the front side of the fan housing.

4. Leaf blower according to claim 2 or 3, wherein components that require cooling are located in a space defined by the curved fan outlet conduit (12).

5. Leaf blower according to claim 2 or 3, wherein components that require cooling are located in an air stream leading to the air inlet (13).

6. Leaf blower according to claim 2 or 3, wherein the engine (14) is connected to the fan wheel axle (17).

7. Leaf blower according to claim 2, wherein the engine (14) is positioned in front of the air inlet.

8. Leaf blower according to claim 1, wherein the front side of the fan housing is closed such that all air entering the fan must flow into the fan housing through the air inlet (13) located on the back side of the fan housing.

9. Leaf blower according to claim 1, wherein the fan housing is adapted to permit air to flow into the fan only through the air inlet (13) located on the back side of the fan housing.

* * * * *